(12) United States Patent
Stuart

(10) Patent No.: US 6,466,935 B1
(45) Date of Patent: Oct. 15, 2002

(54) APPLYING RELATIONAL DATABASE TECHNOLOGY TO PROCESS CONTROL IN MANUFACTURING PROCESSES

(75) Inventor: Anthony Franke Stuart, Deer Isle, ME (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/327,372

(22) Filed: Jun. 4, 1999

(51) Int. Cl.[7] ............................................. G06F 17/30
(52) U.S. Cl. ..................................... 707/10; 707/104.1
(58) Field of Search ........................... 707/1–10, 104.1; 705/1, 10, 16

(56) References Cited

U.S. PATENT DOCUMENTS

| | | | |
|---|---|---|---|
| 5,220,674 A | * 6/1993 | Morgan et al. | 395/800 |
| 5,287,194 A | 2/1994 | Lobiondo | |
| 5,546,577 A | 8/1996 | Marlin et al. | 395/600 |
| 5,566,278 A | 10/1996 | Patel et al. | 395/114 |
| 5,627,764 A | 5/1997 | Schutzman et al. | 364/514 R |
| 5,680,615 A | 10/1997 | Marlin et al. | 395/614 |
| 5,758,074 A | 5/1998 | Marlin et al. | 395/200.8 |
| 5,778,377 A | 7/1998 | Marlin et al. | 707/103 |
| 5,826,239 A | 10/1998 | Du et al. | 705/8 |
| 5,862,404 A | 1/1999 | Onaga | 395/828 |
| 5,870,545 A | 2/1999 | Davis et al. | 395/200.31 |

* cited by examiner

*Primary Examiner*—Diane D. Mizrahi
*Assistant Examiner*—Apu M. Mofiz
(74) *Attorney, Agent, or Firm*—Monica D. Lee; Scott W. Reid (57) ABSTRACT

A system, method, and program for controlling a manufacturing process is described. A highest priority work item having a ready status for a processing step is retrieved from one or more relational database tables. The processing step is performed by either a processing device or by a work flow management system having one or more work managers. Upon completion of the processing step, the status of the work item in the one or more relational database tables is updated to a completed status of the processing step. The completed status of the processing step represents a ready status for a new processing step. For one embodiment of the present invention, the manufacturing process is a production printing and mailing operation that performs a plurality of processing steps on a mail piece. As the mail piece is processed, it is transformed from a print file to printed media in an envelope ready for mailing.

26 Claims, 6 Drawing Sheets

| Job Identifier | Submission Time | Priority | Class | Status | DESC. |
|---|---|---|---|---|---|
| 1731 | 10:00AM | 1 | C | Ready for Printing | 50 |
| 9837 | 08:30 AM | 2 | D | Ready for Printing | 100 |
| 3872 | 11:15 AM | 1 | C | Ready for Printing | 3 |
| 5603 | 06:50 AM | 2 | E | Ready for Printing | 25 |
| 7984 | 9:15 AM | 2 | C | Ready for Binding | 30 |

FIG. 6

APPLYING RELATIONAL DATABASE TECHNOLOGY TO PROCESS CONTROL IN MANUFACTURING PROCESSES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a process control management system for manufacturing processes, and more specifically, to a method, apparatus, and program for scheduling processing steps in manufacturing processes using relational database technology.

2. Description of Related Art

Production printing, mailing and print-on-demand are manufacturing processes that produce books, magazines, brochures, statements, letters, invoices, direct mailings and many other forms of printed materials. Generally, these types of manufacturing processes require data and raw materials as input and provide finished goods and production management statistics as outputs. Manufacturing such printed materials includes the steps of pre-processing the data, committing the data to paper, and post-processing the paper.

Many manufacturing processes are complex and may include over 100 steps that must be properly sequenced from step-to-step. Often, these manufacturing processes are characterized by a high degree of variability, distribution across local and wide area networks, and numerous heterogeneous data processing devices (e.g., servers, workstations, computers, etc.) and production devices (e.g., printers and inserters).

One particularly complex manufacturing environment is the large mail room operation environment. In such an operation, a variety of documents must be printed, fed along conveyor lines for correlation with other documents to comprise the particular mailing, processed through devices which may trim the documents, fold them, place them in envelopes and place them on trays. An address may be printed on the envelope. The operation may include a weighing mechanism to determine the postage that is needed and place the postage on the envelope. There are machines to sort mail according to zip codes and by walk-sequence, i.e., the sequence that a mail carrier will follow delivering mail along a particular route. Finally, the outputs may be boxed according to the location to which they are sent and delivery automatically ordered for the next airplane leaving for that location.

It is not unusual for these types of operations to include several computers, data storage systems, printers from many different manufacturers and complex inserting equipment capable of merging documents from several paths into one stack for folding, cutting, inserting, franking, sorting, and packaging. Many of these large mailing operations are required to produce mailings with outstanding quality while optimizing throughput on the equipment, minimizing errors in the mailing, and reducing the cost per finished piece. This can be accomplished by providing a self-scheduling production process.

SUMMARY OF THE INVENTION

It is an object of the present invention to provide a self scheduling manufacturing process.

A system, method, and program for controlling a manufacturing process is described. A highest priority work item having a ready status for a processing step is retrieved from one or more relational database tables. The processing step is performed by either a processing device or by a work flow management system having one or more work managers. Upon completion of the processing step, the status of the work item in the one or more relational database tables is updated to a completed status of the processing step. The completed status of the processing step represents a ready status for a new processing step.

In preferred embodiments of the present invention, the highest priority work item having a ready status for the processing step is retrieved by querying one or more relational database tables. The relational database table(s) includes at least one row for each work item to be processed and at least one column for each attribute associated with the work item(s). Furthermore, the highest priority work item having the ready status for the processing step is determined by ordering one or more attributes of the work item being processed.

In one embodiment of the present invention, a highest priority print file having a ready status for print pre-processing is retrieved from one or more relational database tables. Print pre-processing is performed on the print file. Upon the completion of the print pre-processing, the status of the print file is updated to a completed status for print pre-processing, which represents a ready status for printing. Additionally, a highest priority print file having the ready status for printing is retrieved from one or more relational database tables. The print file is then printed. Upon the completion of printing, the status of the print file is updated to a completed status for printing, which represents a ready status for print post-processing. Furthermore, a highest priority print file having the ready status for print post-processing is retrieved from one or more relational database tables. The print file is then print post-processed. Upon the completion of print post-processing, the status of the print file is updated to a completed status for print post-processing.

Other objects, features, and advantages of the present invention will be apparent from the accompanying drawings and from the detailed description below.

DETAILED DESCRIPTION

The Work Flow Management System (WFMS) applies relational database technology to process control in various manufacturing environments such as large scale production printing and mailing. More specifically, the WFMS provides means for scheduling processing steps in these types of production environments by using relational databases which store information in indexed tables. The work items (or processing steps) to be performed during production are generally represented by rows in relational database tables, and the control attributes and production management statistics are generally represented by columns in relational database tables.

Figure 1:
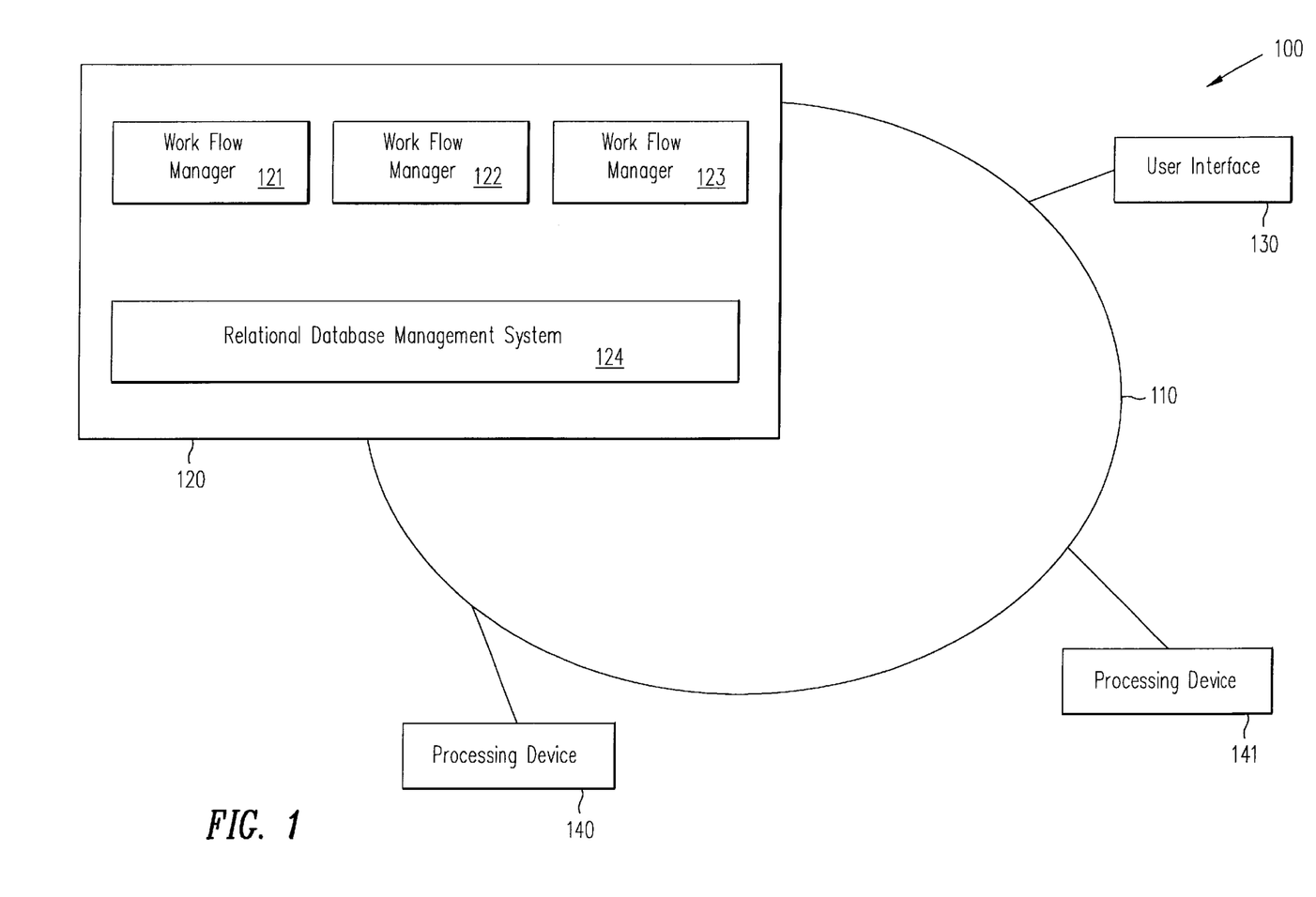
FIG. 1 illustrates one embodiment of a complex production environment according to the present invention.

FIG. 1 illustrates a Work Flow Management System (WFMS) 100 according to one embodiment of the present invention. The WFMS 100 includes (1) a Relational Database Management System 124 with server interfaces and utilities such as the IBM DB2, (2) a highly configurable User Interface 130 such as a graphical user interface (GUI), and (3) one or more Work Flow Managers 121–123. The Relational Database Management System 124 provides the engine for the work flow management process. The Work Flow Managers 121–123 use this engine to control and monitor processes. The User Interface 130 provides the views and tools needed to manage the WFMS 100. The WFMS 100 also includes one or more processing devices 140 and 141.

The processing devices 140 and 141 are typically hardware devices that are used to perform a processing step in WFMS 100. For example, processing devices 140 and 141 may include pre-processing print devices, print devices and post-processing print devices typically used in a production printing and mailing environment. However, it should be noted that one or more processing devices is not a requirement for all WFMS.

A WFMS server 120 is also referred to as a "distributed server cluster" because the WFMS server software is highly modular and location independent and is typically distributed among multiple server nodes. It can run on one or more server nodes that provides an interface (e.g., ODBC/DMI) to the relational database management system (e.g, IBM DB2). For one embodiment of the present invention, the server software may run on various operating systems such as AIX, Windows NT and Windows 95, which may run on various systems such as IBM RS/6000 AIX Scalable Power Parallel (SP) systems and RS/6000 High Availability Cluster MultiProcessing (HACMP) systems. However, those skilled in the art will recognize that WFMS 120 could be comprised of one or more data processing or computer system(s) such as a personal computer, workstation, server, minicomputer, mainframe, etc., and the operating system(s) could comprise any operating system(s), such as OS/390, MVS, VM, OS/2, WINDOWS, MACINTOSH, UNIX, etc. In general, these systems and the WFMS server software running on them, constitute the "distributed server cluster".

The WFMS server 120 includes one or more Work Flow Managers such as Work Flow Managers 121–123. Each Work Flow Manager represents a piece of event driven software that uses its input state to drive its processing and produce an output state.

Within the context of this invention, a Work Flow Manager either polls for an input condition or executes a query, such as a DB2 Structured Query Language (SQL) query, to retrieve its highest priority item of work. In general, a work item (also referred to as a unit of work) may represent various types of intangible (e.g., data, files, etc.) and/or tangible (printed media, media, or various types of raw materials) items. Furthermore, a work item may represent a processing step such as sorting or inserting mail pieces. It processes the work and updates the database to indicate the status of its processing (i.e., successful, failed, additional work required). Note that each of the Work Flow Managers may update the current status to indicate the job is being processed. This is not only useful for display on the screen, but is also an integral part of error restart/recovery.

The processing steps may be implemented by software processes and/or hardware processes. The hardware processing steps are typically processed by a processing device such as Processing Devices 140 and 141. The software processing steps are typically processed by one or more components within WFMS server 120. The processing steps are often arranged to form a complex, multiple node, manufacturing process consisting of input queues, processing steps, and output queues in which the output from one step forms the input to another step and such that each step is inherently self scheduling. The scheduling characteristics are modified by adjusting the query such as an "SQL Select" that retrieves work from the input queue.

The WFMS Server 120 and its various components, User Interface 130, and Processing Devices 140 and 141 are interconnected via a network 110. Network 110 may be comprised of any suitable network architecture known in the art, such as Local Area Network (LAN), Ethernet, Wide Area Network (WAN), System Area Network (SAN), Token Ring, LocalTalk, TCP/IP, the Internet, etc. Alternatively, there may be separate and different networks between WFMS Server 120 and its various components, User Interface 130, and/or Processing Devices 140 and 141.

The Relational Database Management System 120, which may be an IBM DB2 database, can reside on a node that is independent of any other component of the system. For one embodiment of the present invention, the relational database management system 120 is included in the distributed server cluster.

The Relational Database Management System 124 stores information in indexed tables. The relational database tables represent input and output queues for each step in the process such that each process is inherently self scheduling. The WFMS 100 retrieves the highest priority work item by querying or polling the relational database tables. For one embodiment of the present invention, a configurable Structured Query Language (SQL) is used to query the relational database tables. The WFMS 100 processes the work item and updates the attributes in the relational database tables. The process of updating the attributes logically moves the work item from the step's input queue to its output queue. Once the work item's attributes have been updated, and it is logically on the step's output queue the work item can be scheduled by the next step. The attributes may be updated by indicating a process step was successful, failed, or requires additional work. Additionally, WFMS 100 may update the current status of a work item to indicate a job is being processed.

A computer controlled User Interface 130, such as a graphical user interface (GUI) application, can be used by the operations staff of the production process to view the data in the relational database tables and monitor lists of work to do and work completed. Through User Interface 130, the operations staff can change the attributes in the tables, such as priority, to alter the order of jobs selected by the automatic scheduling production process. User Interface 130 may be comprised of any suitable computer controlled user interface, such as command line user interfaces in which the user enters commands; menu-driven user interfaces which present an organized set of choices for the user;

and graphical user interfaces (GUI) in which the user points to and interacts with elements of the interface that are visible, for example by a "mouse" controlled arrow or cursor.

Furthermore user input for User Interface 130 may be received from a keyboard, mouse, pen, voice, touch screen, or any other means by which a human can input data into a computer or data processing system.

For one embodiment of the present invention, User Interface 130 may communicate with WFMS Server 120, which hosts the Work Flow Managers and provides common device interfaces using the industry standard Simple Network Management Protocol (SNMP). Furthermore, the interface between the GUI client and WFMS server 120 and between various Work Flow Manager components may be an industry standard Open Database Connectivity (ODBC) or the Desktop Management Task Force (DMTF) standard Desktop Management Interface (DMI) protocol.

The User Interface 130 (often referred to as a GUI client) provides the interface for management and control functions. It may offer a near real time dynamic reporting system, graphical charting of report data, graphical flow chart and shop floor displays, bar code scanner support, custom dialog boxes, a database browser with view and update capability, SQL queries, touch screen support, a bitmap viewer, support for sound files, configurable triggers and alerts, multilevel security and integrated system administration. The GUI may be configured and customized using an integrated report definition language. For example, the GUI client maps internal database constructs to reports, dialog boxes, flow charts and other elements that are meaningful within the context of a printing and mailing operation.

Figure 2:
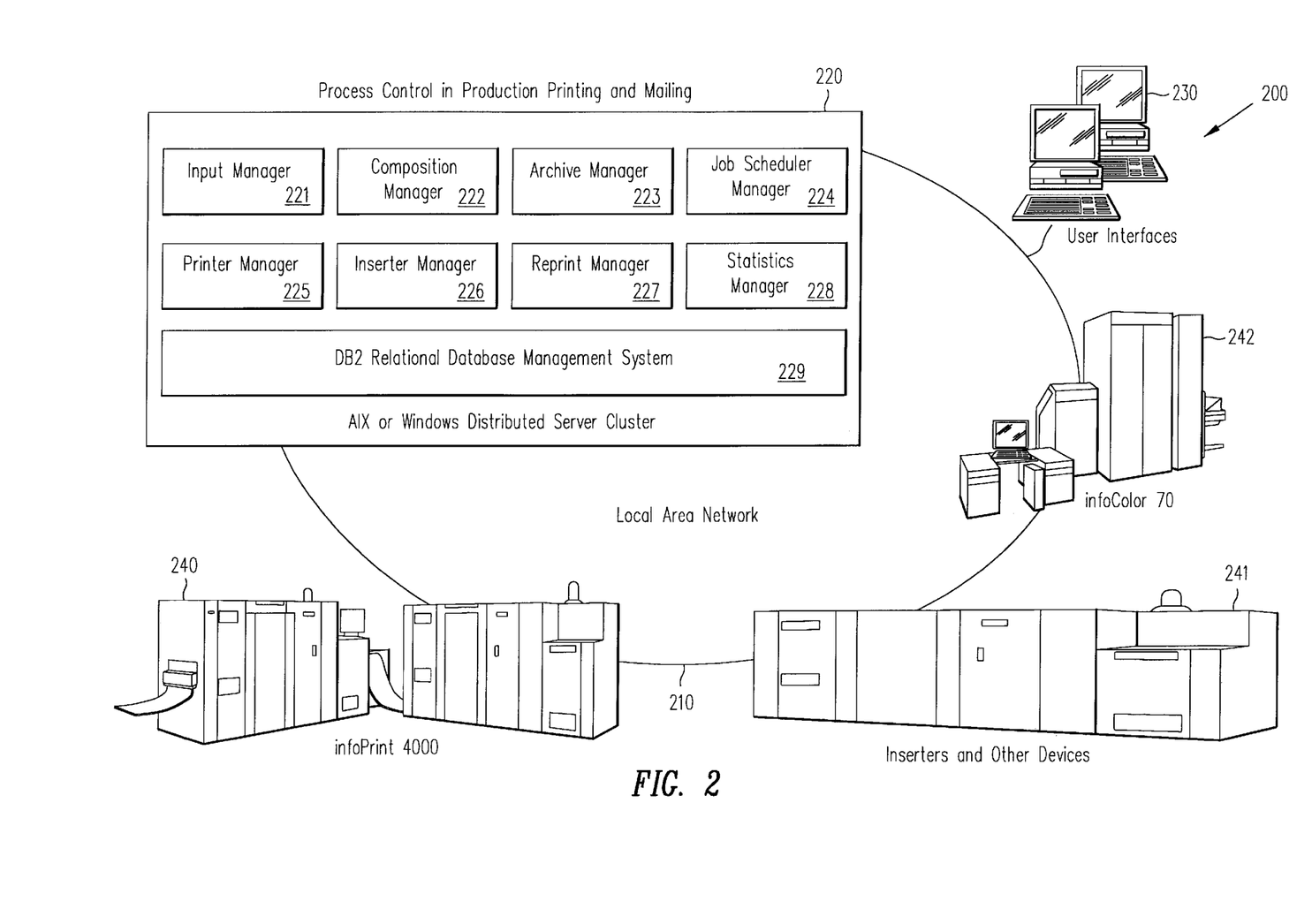
FIG. 2 illustrates one embodiment of a Print Work Flow Manager and its corresponding collection of tables in a relational database.

FIG. 2 illustrates a Work Flow Management System (WFMS) 200 for process control in a production printing and mailing environment according to one embodiment of the present invention. WFMS 200 may be used to receive print data, split it into manageable units of work (or work item), add bar code tracking and control information, schedule it for printing, manage the printing process, collect mail piece status information, and reprint damaged bills and maintains an audit trail. For one embodiment of WFMS 200, the initial work item is print data and the completed work item is a mail piece such as a utility bill in a mailing envelope with postage.

The WFMS 200 includes a WFMS Server 220, a User Interface 230, a Color Printer 242 such as the IBM InfoColor 70 Printer, a Production Printer 240 such as the IBM InfoPrint 4000 Printer, and various Print Post-Processing Devices 241 such as Inserters and Sorters, interconnected via a Local Area Network 210. It should be noted that printers 240 and 242 and devices 241 represent various types of processing devices. The WFMS server 220 includes an IBM DB2 Relational Database Management System 229 and various Work Flow Managers 221–228. InfoColor, InfoPrint, and DB2 are trademarks of IBM. The various Work Flow Managers 221–228 are typically implemented in a WFMS server high level language (such as Korne Shell (KSH)) and uses the core WFMS server utility functions to do its work. Alternatively, the various Work Flow Managers 221–228 may be implemented in any programming language such as Java, C++, etc. Furthermore, Work Flow Managers 221–228 are typically controlled and monitored by the WFMS GUI client 230.

A WFMS referred to as a Print Manager may be used to optimize the scheduling of various print jobs. For example, assume WFMS 200 is used to run a large data center and there are 1000's of jobs that need to be printed. Some print jobs require a specific output form (e.g., preprinted statement form). Some print jobs require a specific device (e.g., capable of printing on both sides of the paper, or stapling). Some print jobs require specific post-processing (e.g. slitting, cutting, trimming and inserting in an envelope). Some print jobs are short (e.g. they can fit into an available scheduling window). Some print jobs are long (they will hold up other jobs). Some print jobs have priorities (e.g. high or low). Some print jobs have integrity requirements (e.g. if you make a mistake you will lose customers). Some print jobs have penalties or incentives (e.g. your service level agreement with customer XYZ requires that you get their jobs out in 48 hours, otherwise, you pay $60K per job).

Described below are various other types of Work Flow Manager components that may be used during production printing and mailing operations. Note a WFMS may include additional Work Flow Manager components not described below. Furthermore, it should be noted that each component may be implemented in a number of different ways.

The Printer Work Flow Manager 225 uses a DB2 SQL query to retrieve its highest priority command. It interprets the command and performs the requested action. It creates and deletes instances of printers. It starts, stops, back spaces, forward spaces, interrupts and resumes printers while they are printing. It updates the status of the printer to indicate work it has performed.

The Input Work Flow Manager 221 polls for the existence of a print job in an input directory. If it finds one, it determines the type of job, either by datastream sniffing (i.e. looking at the first few bytes of the file to see if it is PostScript, PCL, AFP, line mode data, etc.) or by looking at its filename suffix (i.e. not only the datastream types listed previously, but also specific instances of a type, e.g. PostScript data for VISA statements, PostScript data for insurance policies). It then executes a DB2 SQL query to retrieve the defaults (previously set up by the customer) for the job and uses the job defaults (plus any overrides) to create a new record in the job table. Once the record is created in the job table it is ready for subsequent processing.

The Composition Work Flow Manager 222 uses a DB2 SQL query to retrieve its highest priority unit of work (this query, like all Work Flow Manager queries, is customized to reflect customer priorities plus attributes available in the job table). It invokes a job type specific formatting tool (e.g. if this is PostScript, run the IBM standard PostScript to AFP utility, if this is line mode data, run the IBM standard AFP Conversion and Indexing Facility (ACIF), if this is electrical statements run the customer specific ProcData utility). The Composition Work Flow Manager invokes the components of the composition process (all potentially customer specific) and monitors the status of each step. It then updates the job status with error information (if the formatting process failed) or a successful status (meaning the job is ready to be processed by the next step).

The Archive Work Flow Manager 223 uses a DB2 SQL query to retrieve its highest priority unit of work. It then stores the print data in IBM's OnDemand archive system which provides long term optical disk storage and retrieval. The Archive Work Flow Manager component 223, like all managers, is optional, and implemented based on customer requirements.

The Job Scheduler Work Flow Manager 224 uses a DB2 SQL query to retrieve its highest priority unit of work when a printer is ready. It sends the job to the printer, monitors the printing process, records and reports (via the WFMS DB2 tables and the GUI client) on print job status during printing. After the job is printed, it updates job status and statistics (e.g. number of pages printed) to make the job ready for subsequent processing.

The Reprint Work Flow Manager 227 uses a DB2 SQL query to retrieve its highest priority unit of work, typically entered by the OSM GUI client (which is totally DB2 enabled). It extracts pages from the original print data using either page or account number based addressing. It creates a reprint job (both a print file and a DB2 job table entry) containing the pieces that need to be reprinted. It updates the status of the reprint job so that it can be handled by subsequent steps.

The Inserter Work Flow Manager 226 is similar to the Reprint Work Flow Manager 227, but is designed to work with automated inserters (equipment supplied by other companies, e.g. Pitney Bowes that fold mail, combine it with advertising inserts and put it in envelopes for mailing). It collects status information from inserters. It updates the mail piece level information generated by the Composition Work Flow Manager 222. It creates a reprint job (both a print file and a DB2 job table entry) containing the pieces that need to be reprinted due to mutilations in the inserter or lost pieces. It updates the status of the reprint job so that is can be handled by subsequent steps (e.g. Print Job Scheduling).

The Statistics Work Flow Manager 228 uses a DB2 query to collect raw data and create statistical information. This includes information such as the average amount of time that a printer spends idle, printing or in an error state, and if an error state, the amount of time in common error states such as jammed, out of paper, out of toner, or not communicating. The Statistics Work Flow Manager 228 also periodically exports DB2 information to flat files for subsequent processing, archiving and historical analysis.

The Job Retention/Cleanup Work Flow Manager (not shown) uses a DB2 query to retrieve jobs that are ready to be deleted from this system. This typically occurs when their retention period has expired, or when they are marked for deletion. The cleanup manager deletes all the job-related files and information, and then deletes the DB2 record(s) for the job.

A typical WFMS may include multiple components with each component including multiple (e.g. five to twenty) tables. Each table may contain multiple columns. Generally, there is one row for each job, default, device, or other related quantity. Each of these tables contains many attributes.

Figure 3:
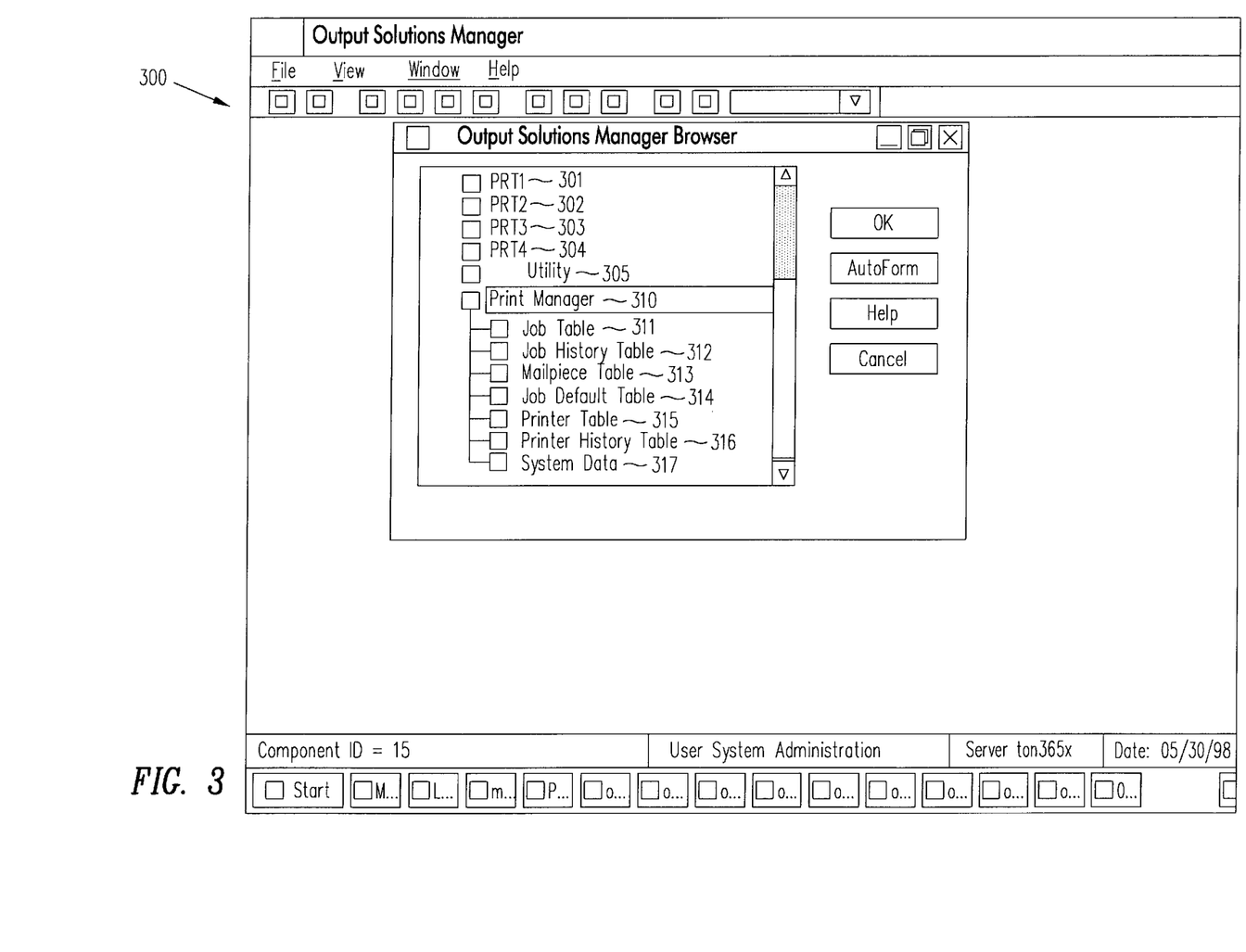
FIG. 3 illustrates one embodiment of a Job table and its corresponding attributes.

The screen capture shown in FIG. 3 illustrates the tables for a Print Manager, as described above for one embodiment of the present invention. For one embodiment of the present invention, the Print Manager includes one or more Work Flow Managers. For this embodiment, the relational database is defined by components, groups and attributes. The components are high level collections of related groups. The groups refer to database tables. The attributes refer to columns within the tables.

The database may be accessed (for purposes of inserting, selecting, updating and/or deleting information) using the ODBC and/or DMI interfaces. In general, the Work Flow Managers submit the queries to a database system. In response to a query, the database system accesses the tables specified in the query to determine which information within the tables satisfies the queries. The information that satisfies the queries is then retrieved by the database system and transmitted to the Work Flow Managers.

In FIG. 3, the information is portrayed hierarchically. Each of the major rows indicates a component (e.g., PRT1 301, PRT2 302, PRT3 303, PRT4 304, Utility 305, and Print Manger 310). The Print Manager 310 is one component which represents a set of DB2 tables. Each of the second level rows indicates a table, such as a DB2 table (e.g., Job Table 311, Job History Table 312, Mailpiece Table 313, etc.). According to this embodiment, the Job Table 311 specifies the attributes that apply to the active jobs in a Print Manager; the Job History Table 312 contains selected Job Table attributes as a function of time and provides a job history or audit trail; the Job Default Table 314 specifies the default attributes that are used to initialize the Job Table; the Printer Table 315 provides a definition for each of the printers in the system and contains information necessary for managing printers; the Printer History Table 316 provides a historical audit trail of printer settings and commands; and the Systems Data 317 contains system data.

Figure 4:
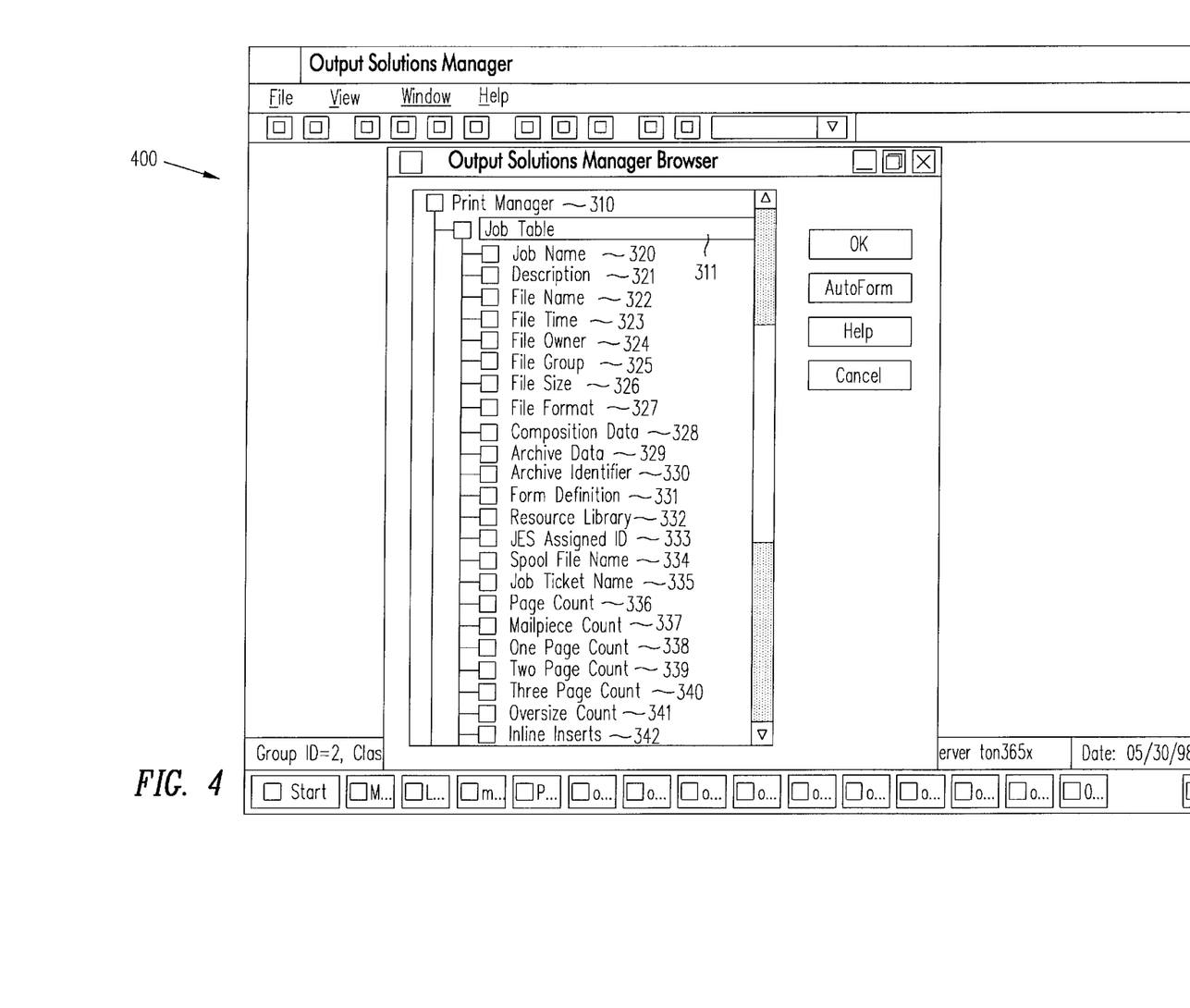
FIG. 4 illustrates a flow chart for production printing and mailing process which is controlled by a Work Flow Management System according to one embodiment of the present invention.

FIG. 4 illustrates a screen display 400 showing the attributes 320–342 (or columns) of the Print Manager Job Table 311 for one embodiment of the present invention. For one embodiment, the Job Name 320 attribute represents the name of the job assigned by the application; the Description 321 attribute represents a text string describing this job; the File Name 322 attribute represents the name of the input file containing the print for this job; the File Time 323 attribute represents the data and time that this print job file was last modified; the File Owner 324 attribute represents the user name of the owner of the print file; the File Group 325 attribute represents the group name of the owner of the print file; the File Size 326 attribute represents the size of the print job file expressed in bytes; the File Format 327 attribute represents the format of the print data contained in the print file for this job; the Composition Data 328 attribute represents the name of the composition command; the Archive Data 329 attribute represents the name of the archive command; the Archive Identifier 330 attribute represents the unique identifier returned by the archive system to identify this instance of data within the archive system; the Form Definition 331 attribute represents the name of the FORMDEF to use when submitting this print job for printing; the Resource Library 332 attribute represents the name of the directory that contains job specific resources required by PSF/AIX for printing; the JES Assigned 333 ID represents a text string specifying the ID assigned by the Job Entry System or Print Manager when print jobs are submitted for spooling (i.e., to correlate release/hold and cancel requests mail job printing by the print job spooler); the Spool File Name 334 attribute represents the name of the spool file containing the data for this job (i.e., the attribute used by print, archive, and reprint service processes that operate on mail job print data); the Job Ticket Name 335 attribute represents the name of the Job Ticket used to control the inserting process for this job; the Page Count 336 attribute represents an integer count of the number of pages; the Mailpiece Count 337 attribute represents an integer count of the number of mailpiece page groups contained within this job; the One Page Count 338 attribute represents the number of mailpieces containing one physical page; the Two Page Count 339 attribute represents the number of mail pieces containing two physical pages; the Three Page Count 340 attribute represents the number of mailpieces containing three physical pages; and the Oversize Count 341 attribute represents the number of mailpieces containing more than three physical pages; the Inline Inserts 342 attribute represents the number of customized inline inserts; the Feeder 1 Inserts attribute represents the number of inserts that the job will select from insert feeder number 1; the Feeder 2 Inserts attribute represents the number of inserts that the job will select from insert feeder number 2; the Split Size attribute represents the approximate number of logical pages to put in an output file when splitting a large input file into multiple smaller output files; the Print Pages attribute represents a system dependent specification of the pages or mailpieces to be printed; the Reprint Pages attribute represents the system dependent specification of the pages or mailpieces to be reprinted; the Pages Processed attribute represents a snapshot of the number of pages processed by the process step identified by Current Status; the Submission Time attribute represents the time that the job was submitted to the system; the Parent Job Name attribute represents the name of the job from which this job was produced; the Retention Period attribute represents the minimum amount of time (in hours) to retain this job after it has finished printing; the Form attribute represents the name of the required media or form to be used when printing this job; the class attribute represents the job class for organizing groups of similar jobs and for prioritizing and assigning jobs; the Priority attribute represents the current priority of the job relative to other jobs of the same scheduling characteristics; the Requested Device attribute represent the requested device; the Current Device attribute represents the name of the current printer or inserter device that is processing the print output of this print job; the Current Status attribute represents the current status of this job; the Message Text attribute represents the optional message text from the last step that processed this job; and the Modified by attribute represents the last operator to make a significant change to the job. Note that this screen capture does not list all the attributes in the table.

It should be noted that the present invention, is directed at the general use of a relational database management system, such as DB2, to implement objects in a WFMS, and is not limited to the specific database structure of a component (i.e., Print Manager component).

Figure 5:
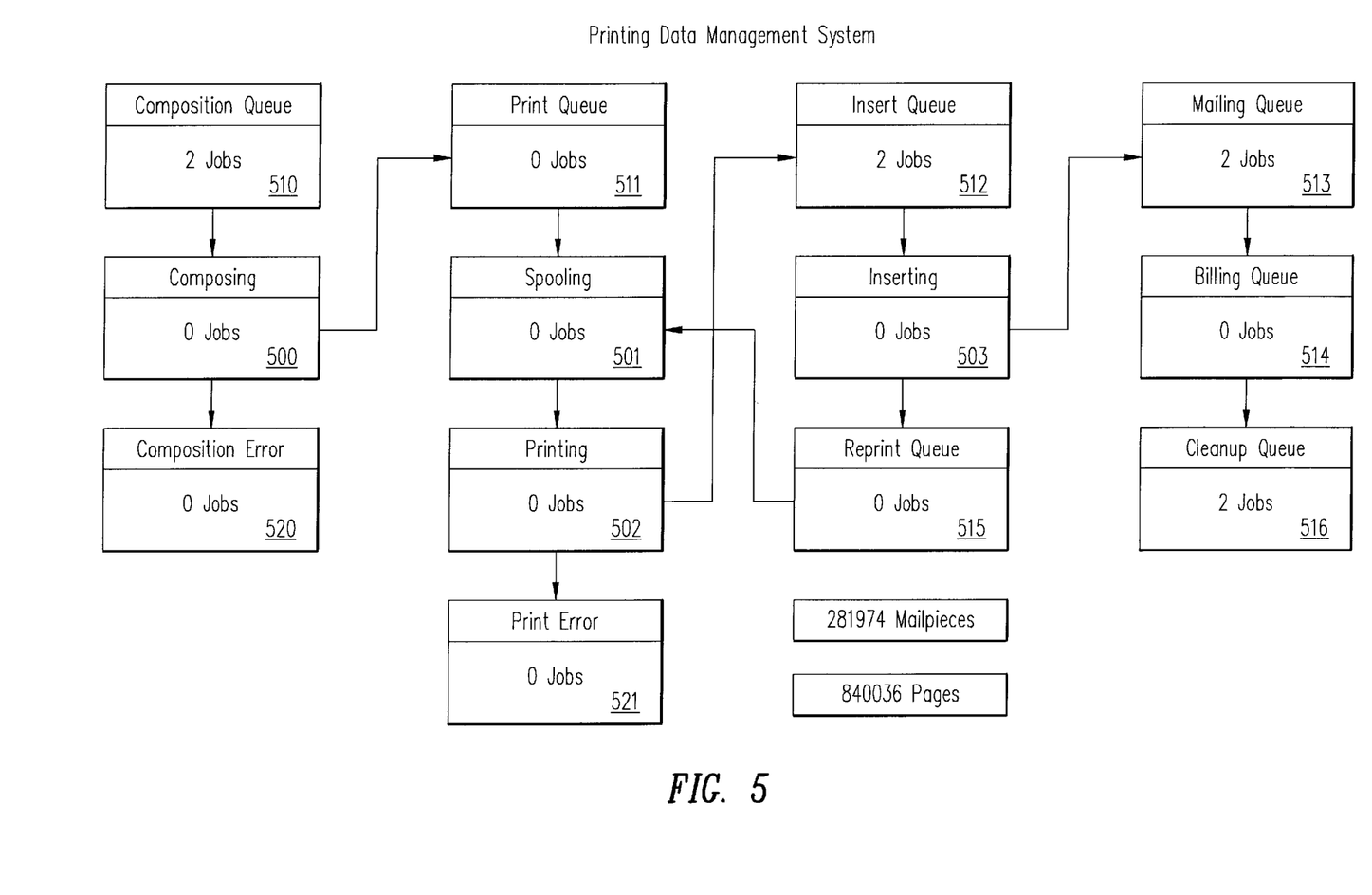
FIG. 5 illustrates one embodiment of a flow chart for a printing and mailing manufacturing process according to the present invention.

FIG. 5 represents one embodiment of a flow chart for a printing and mailing manufacturing process. In general, each box represents a Work Flow Manager step or queue. The Composing 500, Spooling 501, Printing 502, and Inserting 503 boxes represent steps that are performed by various Work Flow Managers. For alternative embodiments, other Work Flow Manager components may be used. The queues may be referred to as DB2 states that represent inputs to subsequent steps or outputs from a preceding step. Note that the Print Queue 511 provides an output for the composing step as well as an input to the Spooling step 501; the Insert Queue 512 provides an output for the Printing step 502 as well as an input into the Inserting step 503; the Reprint Queue 515 provides an output for the Inserting step 503 and an input to the Spooling step 501; and the Mailing Queue 513 provides an output for the Inserting step 503 and an input to the Billing Queue 514.

The Composition Queue 510 is a count (using the SQL COUNT keyword) of the number of jobs in the Composition Work Flow Manager input queue (i.e., current status attribute equals composition ready). Composing refers to the jobs currently being processed by the Composition Work Flow Manager. The Composition Error box 520 refers to jobs that failed that Composition Manager process (e.g. missing font or other resource). The Print Queue box 511 refers to a count of the Print Job Manager input queue. Etc.

Any type of box (i.e., step or queue) is possible. The boxes are actually laid-out using an integral design tool that is part of the GUI client. The GUI provides an extensive set of configurable tools.

Below is an example of an SQL query for a Print Job Work Flow Manager:

lock table [Print Manager|job Table] in exclusive mode;
select
    [p.Job Name],
    [p.Spool File Name],
    locate ([p.Class], I$printer_class') as class_priority,
    [p.Priority],
    [p.Submission Time],
    [p.Form Definition],
    [p.Resource Library],
    [p.Split Size]
from [Print Manager|job Table,p]
where ([p.Current Status]={Print.Queue}
    or [p.Current Status]={Reprint Queue})
and [p.Priority] !={99-Hold}
and [p.Form]='$printer_form'
and ([p.Requested Device]='$printer_name'
    or [p.Requested Device]='')
and locate ([p.Class], '$printer_class')>0
order by
    class_priority,
    [p.Priority],
    [p.Submission Time]
optimize for 1 row;
update [Print Manager|Job Table,p]
set
    [p.Pages Processed]=0,
    [p.Current Status]={Spooling},
    [p.Current Device]='$printer_name',
where [p.Job Name]=[0]

COPYRIGHT IBM CORPORATION 1997

For this example, the Print Job Work Flow Manager wakes up every 15 seconds (configurable) and executes this query. If the query finds a job to print (which is prioritized by the SQL "ORDER BY" clause), and there is a printer ready that can print it (i.e. match on p.Form and other attributes), then the job is dispatched to the printer.

Figure 6:
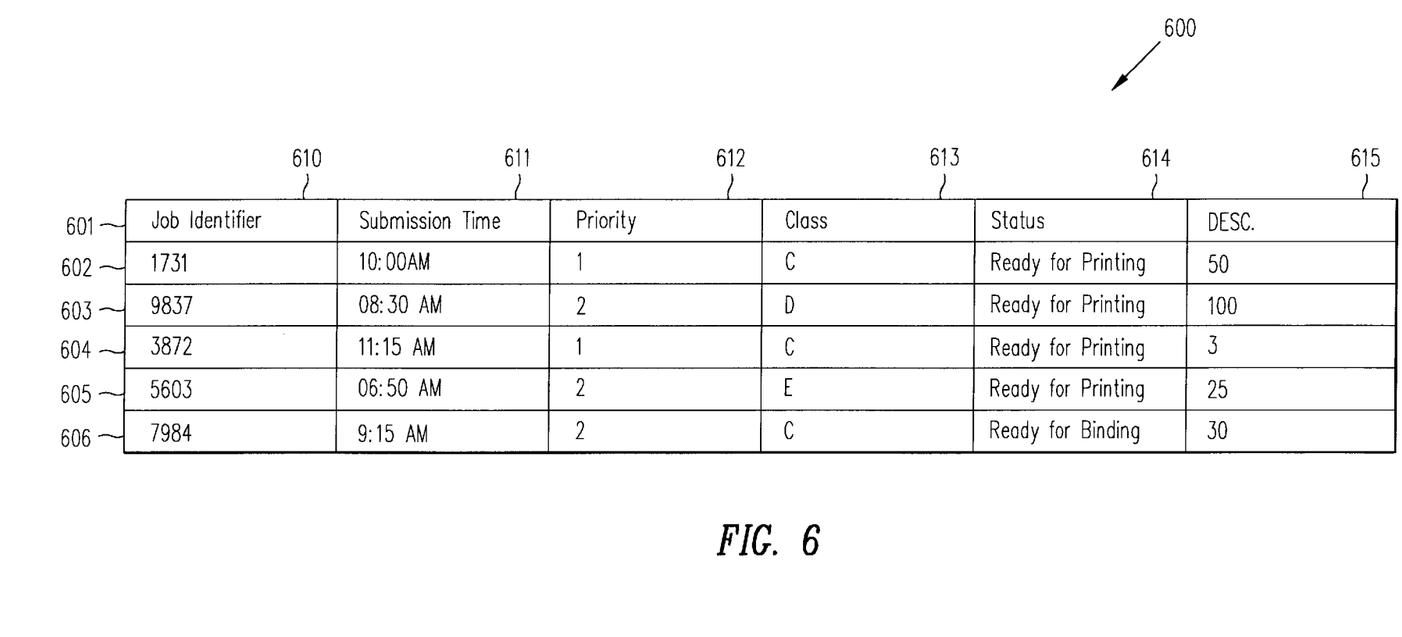
FIG. 6 illustrates a portion of a relational database table according to the embodiment of the present invention.

One example of the "order by" clause used by a Print Job Work Flow Manager to retrieve the highest priority item of work is described below. Referring to FIG. 6, a portion of a Relational Database Table 600 is shown. Reference numbers 601, 602, 603, 604, 605, and 606 represent rows in table 600 and reference numerals 610, 611, 612, 613, and 614 represent columns in table 600. Often relational database tables, such as table 600, does not have an implicit order to the items in the list.

In general, Table 600 includes one row for each work item and one column for each attribute of the work. For a Print Job Work Flow Manager, each work item is typically referred to as a job and may be identified by a "Job Identifier" number such as 1731, 9837, 3872, 5603, and 7984 as shown in Table 600. Attributes for a job to be printed may include "Submission Time", "Priority", "Class", and "Status." Thus, for Job 1731, the Submission Time is "10:00 AM", the Priority is "1", the Class is "C", and the Status is "Ready for Printing".

Note that Table 600 may contain jobs for more than one Work Flow Manager. The Print Job Work Flow Manager is only interested in selecting jobs that are ready for printing. Thus, it identifies jobs that have the right step in the process by specifying the status of "Ready for Printing." The Print Job Work Flow Manager updates the status within the same database transaction, to guarantee that no other Print Job Work Flow Manager in the WFMS will retrieve the same job. The database serializes the access to the print job table within the bounds of the transaction.

When the Print Job Work Flow Manager (i.e., the component that is responsible for sending a job to a printer), is ready to schedule itself (i.e., there is a printer ready), it retrieves the highest priority work item from Table 600. For one embodiment, the Print Job Work Flow Manager uses a standard Structured Query Language (SQL) SELECT statement to retrieve a list of work to do. Note that the SQL SELECT statement supports an optional ORDER BY clause that creates an order in the resulting table. The parameters to the ORDER BY clause are the names of the columns that specify the ordering.

For example, the Print Job Work Flow Manager is programmed to print the jobs with the lowest priority number first. Then for all jobs with the same priority number (i.e., ties), the Print Job Work Flow Manager needs to break the tie by first selecting the jobs with the class letter that is closer to the beginning of the alphabet. Then, for all jobs having the same priority and class, the Print Job Work Flow Manager is programmed to break the tie by first selecting the jobs with the earliest submission time. The result is a prioritized list of jobs for the Print Job Work Flow Manager to process.

The following SQL query may be used by a Print Job Work Flow Manager to retrieve jobs that have a status of "Ready for Printing" and are ordered according to the priority, class, and submissions time attributes.

SELECT <attributes it needs to send the job to the printer, like datastream type, etc.>
FROM job_table
WHERE status='Ready for Printing'
ORDER BY priority, class, submission time

COPYRIGHT IBM CORPORATION 1997

Note that the query (shown above) is specified in a script file. Thus, it can be changed relatively easily. For example, the Print Job Work Flow Manager adds job size in terms of pages to the prioritization scheme (described above) such that short jobs are printed before longer jobs. This can be accomplished by changing the query to:

SELECT <attributes it needs to send the job to the printer, like datastream type, etc.>
FROM job_table
WHERE status='Ready for Printing'
ORDER BY page size DESC, priority, class, submission time

COPYRIGHT IBM CORPORATION 1997

Note that the attribute "DESC", which represents the page size description, has been added to the ORDER BY clause. In the example above, the attribute "DESC" specifies a descending order (i.e., it reverses the sense of the sorting).

For alternative embodiments, various other customized ordering schemes may be implemented by adding attributes to the relational database tables and changing the ordering. For example, all print jobs requiring a particular preprinted form can be prioritized to print before other types of print jobs by adding a Paper Form column to the relational database table and specifying the order of the Paper Form in the ORDER BY clause.

It should be noted that other Print Job Work Flow Managers and other types of Work Flow Managers can use entirely different columns in the database tables for prioritizing their work. The operator (or the developer) of the WFMS may add columns to the relational database tables to add attributes and prioritize work items, such as print jobs, via the GUI.

The Print Job Work Flow Manager as well as the other Work Flow Managers of various embodiment of the present invention are considered self scheduling because they implement a "pull" system (i.e., the Work Flow Manager is an active agent that "pulls" work from other Work Flow Managers by executing a query that identifies the highest priority unit of work). For example, the Print Job Work Flow Manager actively looks for work to do whenever a printer is ready, rather than waiting for work to be sent to it by a supervisor such as in a "push" system.

In general, each Work Flow Manager in the WFMS is considered self scheduling because it does not: 1) care how the job got in this state in the database, 2) care how many processes handled the job upstream (or will process it downstream), or 3) how many other Work Flow Managers are currently looking for work to do (the SQL Lock Table statement ensures that only one of them processes a specific query at a time). Furthermore, the Work Flow Managers can be distributed across servers (nodes) in a multiprocessing (cluster) configuration. Each one is independent of other Work Flow Managers.

The queries are based on the specific requirements of a particular production environment and are implemented in the WFMS server high level language. The queries may also be implemented by either the manufacturer of the WFMS or the customer of the WFMS. Alternative embodiments of the present invention may use query languages other that SQL, and database management systems other than DB2.

The operator, via the WFMS GUI client, has the ability to control and monitor the process. The operator can set attributes in the DB2 database using the WFMS GUI client and custom features. These features include reports (mainly view only, but with configurable hyper links and menus), custom dialog boxes, flow charts and shop floor diagrams (you can double click on any of the objects to request more detailed information), graphical charts, bitmaps, etc.

The above has described a preferred embodiment of the invention in relation to a WFMS for controlling a manufacturing process such as a large print and mail operation.

Using the foregoing specification, the invention may be implemented as a machine, process, or article of manufacture by using standard programming and/or engineering techniques to produce programming software, firmware, hardware or any combination thereof.

Any resulting program(s), having computer readable program code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, PROM, etc. Transmitting devices include, but are not limited to, the internet, intranets, electronic bulletin board and message/note exchanges, telephone/modem-based network communication, hardwired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/ transmitting devices, servers, I/O devices, or any subcomponents or individual parts of one or more processing systems, including software, firmware, hardware or any combination or subcombination thereof, which embody the invention as set forth in the claims.

One skilled in the art of computer science will easily be able to combine the software created as described with appropriate general purpose or special purpose computer hardware to create a WFMS and to create a WFMS subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims.

What is claimed is:

1. A method of controlling a production process, comprising:
   (a) creating at least one row for each work item to be processed and at least one column for each attribute associated with one or more of the work items in one or more relational database tables:
   (b) determining a highest priority work item having a ready status for a processing step based on an ordering of the attributes;
   (c) retrieving said highest priority work item from the one or more relational database tables;
   (d) performing the processing step on the work item or designating one or more processing devices to perform the processing step on the work item; and
   (e) upon completion of the processing step, updating the status of the work item to a completed status for the processing step, the completed status for the processing step representing a ready status for a next processing step.

2. The method of claim 1, further comprising repeating steps (a) through (e) until each of the work items is processed by the one or more processing steps.

3. The method of claim 1. wherein step (b) comprises determining the highest priority work item having the ready status for the processing step by querying the one or more relational database tables.

4. The method of claim 1, further comprising, after step (c), updating the status of the work item to a processing status for the processing step.

5. A method of controlling a production process, comprising:
   (a) creating at least one row for each work item to be processed and at least one column for each attribute associated with one or more of the work items in one or more relational database tables;
   (b) retrieving a highest priority work item having a ready status for a processing step from the one or more relational database tables where priority is determined based on an ordering of the attributes;
   (c) performing the processing step on the work item or designating a processing device to perform the processing step on the work item; and
   (d) upon completion of the processing step, updating the status of the work item to a completed status for the processing step, the completed status for the processing step representing a ready status for a next processing step.

6. A method of controlling a production process, comprising:
   (a) retrieving from a relational database table a highest priority work item having a ready status for a first processing step by querying the relational database table;
   b) performing the first processing step on the work item or designating a first processing device to perform the first processing step on the work item:
   (c) updating the status of the work item to a completed status for the first processing step, the completed status for the first processing step representing a ready status for a second processing step;
   (d) retrieving from the relational database table the highest priority work item having a ready status for the second processing step by querying the relational database table;
   (e) performing the second processing step on the work item or designating a second processing device to perform the second processing step on the work item; and
   (f) updating the status of the work item to a completed status for the second processing step, the completed status for the second processing step representing a ready status for a next processing step.

7. The method of claim 6, further comprising:
   (g) creating at least one row for the work item and at least one column for each attribute associated with the work item in the relational database table.

8. The method of claim 7, further comprising, prior to step (a), determining the work item having the highest priority ready status for the first processing step based on a first ordering of the one or more attributes; and
   further comprising, prior to step (d), determining the work item having the highest priority ready status for the second processing step based on a second ordering of the one or more attributes.

9. The method of claim 6, further comprising,
   (g) repeating steps (d) through (f) until the work item is fully processed.

10. The method of claim 9, further comprising, after step (a), updating the status of the first work item to a processing status for the first processing step; and
    further comprising, after step (d), updating the status of the second work item to a processing status for the second processing step.

11. A method of controlling a production printing process, comprising:
    (a) creating at least one row in a first set of relational database tables for each large print file to be processed by a plurality of processing steps;
    (b) retrieving a highest priority large print file from the first set of relational database tables;
    (c) subdividing the highest priority large print file into multiple small print files;

(d) creating at least one row in a second set of relational database tables to represent each of the small print files;

(e) retrieving a highest priority small print file having the ready status for print pre-processing from the second set of relational database tables;

(f) performing the print pre-preprocessing on the small print file or designating a second processing device for performing the print pre-processing on the small print file; and (g) upon completion of print pre-processing, updating the status of the small print file to a ready status for printing (h) retrieving a highest priority small print file having a ready status for printing from the second set of relational database tables;

(i) printing the small print file or designating a second processing device to print the small print file; and (j) upon completion of printing, updating the status of the small print file to a ready status for print post-processing.

12. The method of claim 11, further comprising:

(k) retrieving a highest priority small print file having the ready status for print post-processing from the second set of relational database tables;

(l) performing the print post-processing on the small print file or designating a third processing device to perform print post-processing on the small print file; and (m) upon completion of the print post-processing, updating the status of the small print file to a completed status for print post-processing.

13. A method of controlling a production printing process, comprising:

(a) creating at least one row for each print file to be processed and at least one column for each attribute associated with one or more of the print files in one or more relational database tables;

(b) determining a highest priority print file having a ready status for print pre-processing based on a first ordering of the attributes;

(c) retrieving said highest priority print file for print pre-processing from the one or more relational database tables;

(d) performing the print pre-processing on the print file or designating a first processing device to perform the print pre-processing on the print file;

(e) upon completion of the print pre-processing, updating the ready status of the print file to a ready status for printing;

(f) retrieving sold highest priority print file for printing from the one or more relational database tables;

(g) printing the print file or designating a second processing device to print the print file;

(h) upon completion of printing, updating the status of the print file to a ready status for print post-processing;

(i) determining a highest priority print file having a ready status for priority based on a second ordering of the attributes;

(j) retrieving said highest priority print file for print post-processing from the one or more relational database tables;

(k) performing print post-processing on the print file or designating a third processing device to perform print post-processing on the print file; and (l) upon completion of print post-processing, updating the status of the print file to a completed status for print post-processing.

14. The method of claim 13, further comprising repeating steps (b) through (l) until each of the print files is processed by one or more processing steps.

15. The method of claim 13, wherein step (c) comprises retrieving the highest priority print file having the ready status for print pre-processing from the one or more relational database tables by querying the one or more relational database tables, and wherein step (f) comprises retrieving the highest priority print file having the ready status for printing from the one or more relational database tables by querying the one or more relational database tables, and wherein step (j) comprises retrieving the highest priority print file having the ready status for print post-processing from the one or more relational database tables by querying the one or more relational database tables.

16. The method of claim 13, further comprising, after step (c), updating the status to a processing status for print pre-processing, and further comprising, after step (f), updating the status to a processing status for printing, and further comprising, after step (j), updating the status to a processing status for print post-processing.

17. The method of claim 13, wherein the highest priority print file having the ready status for print pre-processing represents data, and wherein the highest priority print file having the ready status for printing represents data, and wherein the highest priority print file having the ready status for print post-processing represents printed media.

18. A method of manufacturing finished goods, comprising:

(a) creating at least one row for each work item to be processed and at least one column for each attribute associated with one or more of the work items in one or more relational database tables;

(b) determining the highest priority work item having the ready status for the processing step based on an ordering of the one or more attributes (c) retrieving said highest priority work item from the one or more relational database tables;

(d) performing the processing step on the work item; and (e) upon completion of the processing step, updating the status of the work item to a completed status for the processing step, the completed status for the processing step representing a ready status for a next processing step.

19. The method of claim 18, further comprising repeating steps (b) through (e) until each of the work items is processed by the one or more processing steps required to manufacture the finished goods.

20. The method of claim 18, wherein step (c) comprises retrieving the highest priority work item having the ready status for the processing step by querying the one or more relational database tables.

21. The method of claim 18, further comprising, after step (c), updating the status of the work item to a processing status for the processing step.

22. The method of claim 18, wherein step (d) comprises performing the processing step on the work item by a processing device.

23. A computer program having computer-readable program code means on a computer-usable medium, the computer program comprising:

(a) means for causing the creation of at least one row for each work item to be processed and at least one column for each attribute associated with one or more work items in one or more relational database tables:

(b) means for causing the determination of the highest priority work item having the ready status for the processing step based on an ordering of the one or more attributes;

(c) means for causing the retrieval of a highest priority work item having a ready status for a processing step from one or more relational database tables;

(d) means for causing the processing of the processing step on the work item; and (e) means for causing the updating of the status of the work item to a completed status for the processing step upon completion of the processing step, the completed status for the processing step representing a ready status for a next processing step.

24. The computer program of claim 23, further comprising means for causing the querying of the one or more relational database tables.

25. The computer program of claim 23, further comprising means for causing the updating of the status of the work item to a processing status for the processing step.

26. A computer program having computer-readable program code means on a computer-usable medium, the computer program comprising:

(a) means for causing the creation of at least one row for each work item to be processed and at least one column for each attribute associated with one or more of the work items in one or more relational database tables;

(b) means for causing the retrieval of a highest priority work item having a ready status for a processing step from the one or more relational database tables where priority is determined based on an ordering of the attributes;

(c) means for causing the processing of the processing step on the work item or causing a processing device to perform the processing step on the work item; and (d) means for causing the updating of the status of the work item to a completed status for the processing step upon completion of the processing step, the completed status for the processing step representing a ready status for a next processing step.

* * * * *